United States Patent [19]

Heenan et al.

[11] 3,825,186

[45] July 23, 1974

[54] IRRIGATION RISER BASE SYSTEM

[75] Inventors: Richard H. Heenan; George M. Litsinger, both of Atlanta, Ga.

[73] Assignee: The Coca-Cola Company, Atlanta, Ga.

[22] Filed: Apr. 20, 1973

[21] Appl. No.: 353,055

[52] U.S. Cl. .................................. 239/280, 239/579
[51] Int. Cl. ............................................ B05b 3/10
[58] Field of Search ........... 239/200, 201, 203, 204, 239/273, 276, 280, 280.5, 281, 285, 579

[56] References Cited
UNITED STATES PATENTS

| | | | |
|---|---|---|---|
| 3,033,467 | 5/1962 | Hofer | 239/201 X |
| 3,083,914 | 4/1963 | Smith et al. | 239/201 X |
| 3,193,205 | 7/1965 | Hanson | 239/276 |
| 3,684,179 | 8/1972 | Fischer et al. | 239/203 |

FOREIGN PATENTS OR APPLICATIONS

| | | | |
|---|---|---|---|
| 295,946 | 7/1963 | Netherlands | 239/276 |
| 16,164 | 6/1906 | Norway | 239/281 |
| 1,154,369 | 6/1969 | Great Britain | 239/276 |

*Primary Examiner*—M. Henson Wood, Jr.
*Assistant Examiner*—Michael Y. Mar
*Attorney, Agent, or Firm*—W. Dexter Brooks

[57] ABSTRACT

An irrigation riser base system is described which substantially improves the support capabilities of a permanent overhead irrigation system in different soil conditions, including sandy soils. The irrigation riser base system is composed of an improved riser base that is sunk into the soil for a length sufficient to facilitate its connection to a central irrigation system connected to the base and arising approximately 20–25 feet above the ground is a riser pipe that has a sprinkler head fastened to the top end thereof. During normal operations, an irrigating liquid is supplied through the system and distributed to the citrus trees or other vegetation. The irrigation riser base system is lightweight, yet strong and rigid for dependable performance in different soil conditions, has excellent support capabilities in sandy soils, inexpensive to manufacture and requires very little maintenance over extended use.

8 Claims, 4 Drawing Figures

IRRIGATION RISER BASE SYSTEM

BACKGROUND OF INVENTION

The present invention relates to an irrigation riser base system having improved support capabilities in different soil conditions such as, for instance, citrus trees that are planted in sandy soils.

Many citrus products are grown on trees planted in sandy soils. In order to insure adequate irrigation and water supply for the citrus trees, it is frequently necessary to provide a supplemental water supply or irrigation system to buttress the annual rainfall. The irrigation system is principally used during the blooming season for the citrus product and thereafter, as needed on a seasonal basis, being dependent of course on the amount of rainfall and moisture present in the soil.

There are presently available a wide variety of irrigation systems utilized for this purpose. However, many of these irrigation systems have not been found totally acceptable because of sundry reasons. For example, a common form of irrigation is to provide a portable irrigation system, having removable pipe sections that are linked together and distributed among the citrus groves. This method of irrigation has not been found acceptable, since it is primarily dependent on the availability of an adequate labor force. The nature of the portable equipment itself requires the labor force to lay the pipe members, move these pipe sections from one section of a citrus grove to another, and perform the normal maintenance problems attendant to such a portable system. In recent years, it has been difficult, and in some areas virtually impossible to locate seasonal labor to operate a portable system. Moreover, another problem encountered is that the portable system will require a substantially larger amount of water during irrigation to compensate for run off that occurs as a result of the higher flow rate of the design of this type of system.

As a result of the above, a great number of citrus producers have adopted more efficient, permanent type of irrigation system(s). These permanent irrigation systems are normally comprised of underground piping which are evenly distributed among the groves and sunk into the soil a length sufficient to facilitate their connection to a central irrigation system. This underground piping in turn is led to an embedded riser base which in turn supports a riser pipe. The riser bases frequently employed are made from concrete and sunk into the soil for a sufficient length to anchor the riser pipes that are extended upward therefrom approximately 20–25 feet above the ground. Sprinkler heads are fastened to the outward ends of the riser pipes and serve to distribute the irrigating liquid to the citrus trees. While these permanent overhead irrigation types of system may be operated with a minimal amount of labor simply by opening a valve to the grove section to be irrigated and starting the pump unit, they have not been found totally acceptable due to the considerable problems that have occured with the concrete riser bases.

In order that the riser base support the riser pipe, it is necessary that the base possess sufficient stability and weight to overcome those forces imposed on the base and through the riser pipe. For example, the base must overcome the action of the sprinkler head attached to the end of the riser pipe, the riser pipe itself, wind forces, and adjoining forces propagated by the citrus trees. These forces must be transmitted into the soil by the riser base while maintaining its own stability in the soil. Accordingly, these known concrete riser bases are generally rectangular in shape and have a typical size of approximately 5 inches × 5 inches × 3 inches with an assembled weight of approximately 65 pounds. It is believed the rectangular shape of the bases has evolved not so much from a structural design standpoint, but rather from the ease in forming the shape in concrete.

It has been found that these riser bases are expensive to manufacture and the heavy weight of these concrete riser bases creates many problems, including being difficult to ship and install. Moreover, distribution of the bases within the citrus groves is sometimes done by throwing the bases from the back of a truck into an area adjacent to a location where the respective bases will be installed. This operation subjects the bases to certain shocks, which have a tendency of cracking the concrete, resulting eventually in leakage within the base and maintenance thereof.

Accordingly, there has arisen a need in the industry for the production of an improved irrigation riser base system, preferably of simple and sturdy construction, light in weight, inexpensive to manufacture, and having stable, efficient, support capabilities in different soil conditions over extended use.

OBJECTS OF INVENTION

The present invention has for an object the provision of a relatively simple, dependable and stable irrigation riser base system. The invention is particularly adaptable for use in the irrigation of citrus trees that are planted in sandy soils or soils having different support capabilities. Still another object is the provision of an irrigation system which may be easily manufactured and efficiently handled during installation, use and repair and which, although of wide general application, is particularly useful for permanent types of irrigation system in the citrus industry. Another object of the present invention is to provide irrigation systems of the above character which are efficient, sturdy in construction, light in weight, inexpensive to manufacture and requires very little maintenance over extended use. Another object is to provide an improved riser base unit which is light in weight, inexpensive to manufacture and dependable over extended use. A further object is to provide a riser base unit that is readily adaptable to being attached to a riser pipe so as to allow routine maintenance of the riser pipe while retaining a quick release seal at the top end of the riser base to prevent leakage between the riser pipe and the riser base members. These, other and further objects, important features, and advantages of the further invention to which attention has not been specifically directed hereinabove will be better understood and appreciated by those skilled in the art by the following detailed description of the invention taken in conjunction with the accompanying drawings.

BRIEF DESCRIPTION OF DRAWINGS

The present invention will now be described, by way of example, by reference to the accompanying drawings.

DETAILED DESCRIPTION OF INVENTION

Figure 1:
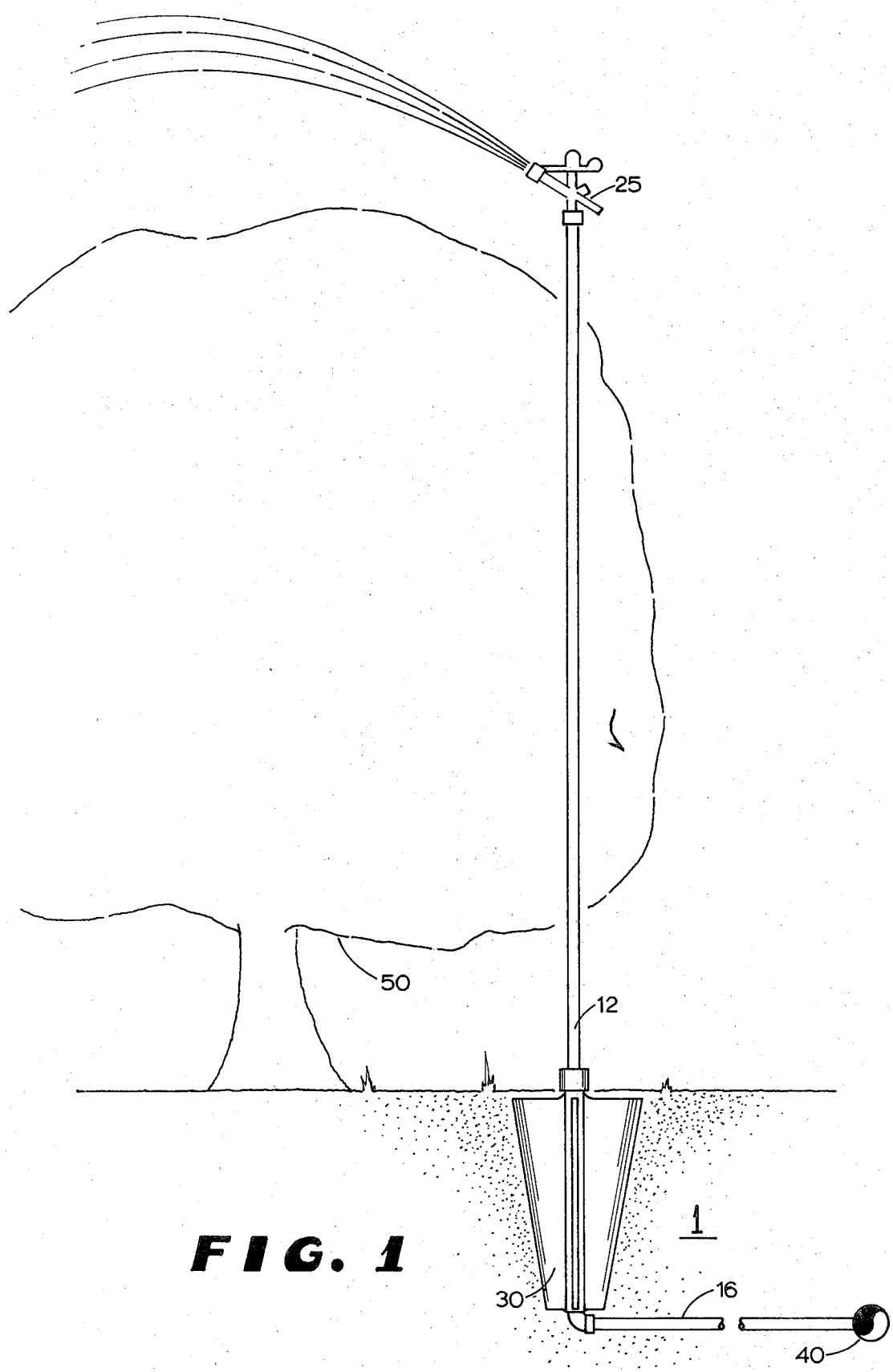
FIG. 1 is a perspective view of the irrigation riser base 30 system installed in a typical citrus grove.

Referring now to the accompanying drawings in which reference characters designate corresponding structure throughout the several views, there is illustrated the irrigation riser base system provided by the present invention, More specifically, as illustrated in FIG. 1, the irrigation riser base system 1 includes generally a permanently installed riser pipe 12, a sprinkler 25 fastened to the top end of the riser pipe 12 above a typical citrus tree 50, a riser base 30, underground piping sections 16 and a water distribution header 40.

While the riser pipes 12 may be spaced apart in any desired configuration throughout a citrus grove, in the preferred embodiment, the pipes 12 are spaced from about 75 ft. × 75 ft. to 75ft. × 90 ft. apart, rise approximately 20-25 feet above the ground and provide approximately 7 ½ sprinklers 25 per acre of citrus groves 50. An irrigating liquid is supplied through the system 1, by virtue of a conventional pumping unit (not shown) which is associated with the water distribution header 40. During a normal operation, the pumping unit supplies the irrigating liquid from header 40 through underground piping sections 16 to a riser base 30 where the liquid is subsequently distributed through the riser pipes 12 and sprinklers 25 to the citrus trees 20. This type of irrigation system is capable of distributing any desired amount of irrigating liquid, but normally ⅛ inch of irrigating liquid per hour, or 1 ½ inches of irrigating liquid in 12 hours on a 7 day frequency. Moreover, the system is operated with a minimal amount of labor simply by opening a valve to the grove section to be irrigated and starting the pumping unit.

Figure 2:
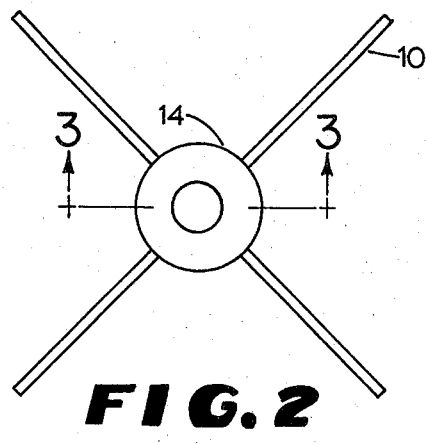
FIG. 2 is a top view of the riser base of the present invention showing the locking cap 14 and fin members 10 that are associated with the riser base member 30.
Figure 3:
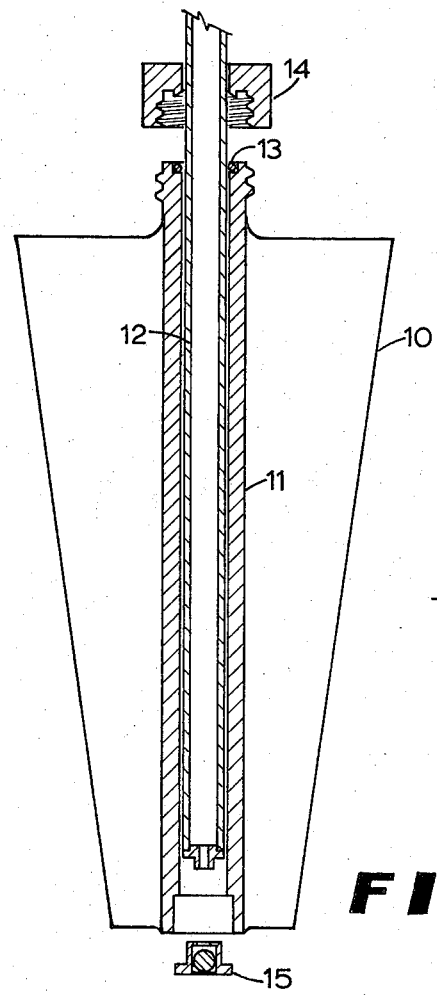
FIG. 3 is a sectional view taken along Line 3—3 in FIG. 2.
Figure 4:
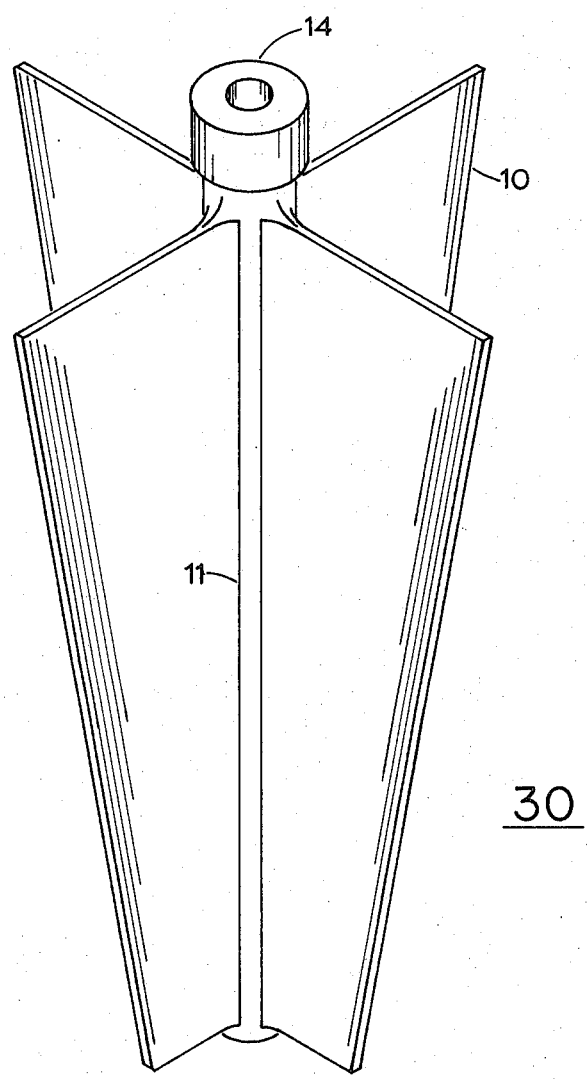
FIG. 4 is a pictoral view looking from the top and side of the riser base 30 of the present invention.

Referring to FIGS. 2 and 4, there is shown the riser base 30 of the present invention incorporating a plurality of fins 10 that are cast or molded integrally with a central longitudinal tube 11. The central tube 11 is designed so as to function as a sleeve to support the riser pipe 12 which as shown in FIG. 3 is slidably positioned within a substantial portion of the tube 11 for excellent support and stability. The central tube 11 further functions to transmit forces from the riser pipe 12 to the fins 10 and thereafter, to the soil.

As depicted in FIG. 3, an O-ring 13 provides a seal between the central tube 11 and the riser pipe 12 by virtue of a locking screw cap 14 which is tightened into position around the O-ring 13. In addition to creating a seal and preventing leakage between tube 11 and riser pipe 12, the O-ring 13 and cap 14 cooperate together and place a certain degree of tension upon the exterior surface of riser pipe 12 to prevent rotation thereof. Since the degree of tension can be relieved by loosening cap 14 in relation to the riser pipe 12 within the central tube 11, the riser pipes are easily removable for cleaning. At the lower end of central tube 11, a check valve 15 may be provided, if desired, to prevent the flow of irrigating liquid into the riser base 30 when the riser pipe 12 is removed during cleaning. The check valve 15 allows open flow when the riser pipe 12 is in position, but closes by hydraulic pressure when the riser pipe 12 is removed.

Whereas, as noted earlier, conventional concrete riser bases may weight approximately 65 pounds, the improved riser base 30 of the present invention is manufactured of plastic, such as structural foam polyethylene, and has dimensions of about 12 inches × 12 inches × 22 inches and weighs as little as 3 pounds. This sturdy, lightweight material not only makes the riser base 30 easier to install, handle and maintain in the citrus groves, but makes it easier to ship and handle in transit and reduces shipping costs.

In the form of the invention illustrated, the improved riser base 30 is designed such that the shape is determined in accordance with sound engineering principles. As shown in FIG. 3, fins 10 are designed to taper from the top to the bottom of the riser base 30 to take advantage of the soil resistance capabilities. This fin design allows forces to be transmitted from the riser pipe 12 into the adjoining soil in such a way as to minimize the amount of material required in the fabrication of the riser base 30 while still providing appropriate surface area in accordance with soil resistance capabilities. It has been found that a riser base utilizing such tapered fins is less expensive and outperforms the conventional rectangular form of riser base in transmitting forces into the soil. It is recognized that the soil resistance is greater at the lower end of the riser base 30 than at the upper end. Accordingly the shape of the riser base of the present invention is such that the surface area at the top is greater than that at the lower end. This change in surface area and configuration minimizes the amount of material required and makes the best use of the support capabilities of the soil.

From the foregoing, it will be apparent that we have provided a lightweight, inexpensive irrigation riser base system having improved support capabilites in different soil conditions and which requires very little maintenance over extended use.

It is believed that the present invention, its mode of construction, assembly and operation, and many of its advantages attendant thereto should be readily understood from the foregoing without further description and it should also be manifest that, while a preferred embodiment of the invention has been shown and described for illustrative purposes, the structural details are nevertheless capable of wide variation within the purview of the invention. For example, while the riser base 30 has been described as being manufactured of a structural foam of plastic polyethylene, the riser base may also be made of other suitable plastic materials. Moreover, it should be readily apparent that these other plastic materials may be used for the manufacture of the top cap, check valves and piping elbows. Also, while the riser base of the present invention is preferably designed for use in sandy soil, the number of fins and their shape or configuration could be readily modified and the riser base used for differing soil conditions.

It should also be apparent that while the improved riser base is illustrated in relation to an irrigation system, the base could be used also to improve the support capabilities of fence posts, mail boxes, highway signs, flag poles and other similar structures in sandy soil. Moreover, by manufacturing the riser base of a plastic material in lieu of a conventional material, the system is adaptable for use in waste disposal systems.

While a preferred embodiment of the invention has been disclosed and described herein, the structural limitations are nevertheless capable of wide variation within the purview of the invention as defined in the appended claims.

The embodiments of the invention in which an exclusive property right or privilege is claimed are defined as follows.

We claim:

1. An irrigation riser base system which is lightweight, yet strong and rigid for dependable performance in different soil conditions including the combination of a water distribution header, underground piping, riser base, riser pipes and sprinkler heads, wherein the improvement comprises a riser base having a central longitudinal tube manufactured of a plastic material with a plurality of fin portions integrally formed together therewith, said fin portions extending substantially from the top to the bottom of the riser base to take advantage of the soil resistance capabilities when embedded in the soil, and to create excellent dissipation of any external forces that are transmitted from the sprinkler head, attached to the end of the riser pipe, and wherein a locking screw cap and O-ring assembly are provided on the top of the riser base to create a quick release coupling seal and prevent leakage between the central tube and riser pipe, and further wherein said longitudinal tube being adapted to couple with the riser pipe and a check valve assembly is provided at the bottom of the riser base so as to prevent the flow of the irrigating liquid from the distribution header into the riser base when the riser pipe is removed for cleaning.

2. An irrigation riser base system as defined in claim 1, wherein said plurality of fin portions comprises at least three fin portions which are tapered from the top to the bottom of the riser base and equally spaced around the exterior surface of said central longitudinal tube and extend substantially from the top to the bottom of the riser base.

3. An irrigation riser base system as defined in claim 1, wherein the entire riser base has dimensions of about 12 inches × 12 inches × 22 inches and weighs about 3 pounds.

4. An irrigation riser base system as defined in claim 1, wherein the riser base is manufactured of a structural foam polyethylene material.

5. An irrigation riser base system as defined in claim 1, wherein said plurality of fin portions comprises at least four fin portions which are equally spaced around the exterior surface of said central longitudinal tube.

6. A riser base which is lightweight, yet strong and rigid for dependable performance when used in an overhead irrigation system and wherein said riser base comprises a central longitudinal tube manufactured of a plastic material with a plurality of fin portions integrally formed together therewith, said fin portions extending substantially from the top to the bottom of the riser base to take advantage of the soil resistance capabilities when embedded in the soil and to create excellent dissipation of any external forces that are transmitted to the riser base, and wherein a locking screw cap and O-ring assembly are provided on the top of the riser base to create a quick release coupling seal and prevent leakage between the central tube and riser pipe when said riser base is coupled to a riser pipe, and further wherein a check valve assembly is provided at the bottom of the riser base to prevent the flow of an irrigating liquid from a distribution header into the riser base when a riser pipe is removed for cleaning purposes.

7. A riser base as defined in claim 6, wherein the plurality of fin portions and longitudinal tube are manufactured of a structural foam polyethylene material.

8. A riser base as defined in claim 6, wherein the entire base has dimensions of about 12 inches × 12 inches × 22 inches and weighs about 3 pounds.

* * * * *